(12) United States Patent
Inada

(10) Patent No.: US 7,890,949 B2
(45) Date of Patent: Feb. 15, 2011

(54) DRIVER SOFTWARE INSTALLING SYSTEM

(75) Inventor: Hajime Inada, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1041 days.

(21) Appl. No.: 10/745,547

(22) Filed: Dec. 29, 2003

(65) Prior Publication Data

US 2004/0187105 A1 Sep. 23, 2004

(30) Foreign Application Priority Data

Jan. 6, 2003 (JP) ............................. 2003-000115

(51) Int. Cl.
*G06F 9/445* (2006.01)

(52) U.S. Cl. ................. 717/174; 717/175; 717/176; 717/177; 717/178

(58) Field of Classification Search .......... 717/174–178
See application file for complete search history.

(56) References Cited

U.S. PATENT DOCUMENTS

| | | | | |
|---|---|---|---|---|
| 5,630,076 | A * | 5/1997 | Saulpaugh et al. | 710/104 |
| 5,950,002 | A | 9/1999 | Hoford et al. | |
| 6,216,176 | B1 | 4/2001 | Kadota | |
| 6,418,555 | B2 * | 7/2002 | Mohammed | 717/175 |
| 6,915,514 | B1 * | 7/2005 | Machida | 717/174 |
| 6,944,858 | B2 * | 9/2005 | Luu | 717/174 |
| 6,954,930 | B2 * | 10/2005 | Drake et al. | 717/178 |
| 6,976,252 | B2 * | 12/2005 | White et al. | 717/174 |
| 7,150,025 | B2 * | 12/2006 | Gentry et al. | 717/174 |
| 2002/0083431 | A1 * | 6/2002 | Machida | 717/174 |
| 2002/0138567 | A1 | 9/2002 | Ogawa | |
| 2002/0174264 | A1 * | 11/2002 | Fuller et al. | 717/176 |
| 2003/0051235 | A1 * | 3/2003 | Simpson | 717/174 |
| 2004/0194082 | A1 * | 9/2004 | Purkeypile et al. | 717/174 |
| 2004/0210680 | A1 | 10/2004 | Yamamura et al. | |
| 2004/0210897 | A1 * | 10/2004 | Brockway et al. | 717/174 |

FOREIGN PATENT DOCUMENTS

| | | |
|---|---|---|
| JP | A 6-35681 | 2/1994 |
| JP | A 7-219865 | 8/1995 |
| JP | A 8-44762 | 2/1996 |
| JP | A 9-305523 | 11/1997 |
| JP | A 10-232767 | 9/1998 |
| JP | A 11-110331 | 4/1999 |
| JP | A 2000-353079 | 12/2000 |
| JP | A 2002-055821 | 2/2002 |
| JP | A 2002-278906 | 9/2002 |
| JP | A 2004-62397 | 2/2004 |

* cited by examiner

*Primary Examiner*—Wei Y Zhen
*Assistant Examiner*—Junchun Wu
(74) *Attorney, Agent, or Firm*—Oliff & Berridge, PLC

(57) ABSTRACT

A driver software installing system is provided with a computer connected to an electronic device. The system includes an installation system that performs installation of driver software in the computer in accordance with a procedure of an operating system of the computer, and a setup system that performs setup of the driver software that is installed in the computer by the driver software installation system. Further, the setup system includes an instructing module that instructs the installation system to generate identification information for identifying the driver software when the installation of the driving software is performed, an identifying module that identifies the driver software to be set up based on the identification information generated by the installation system in response to the instruction of the instructing module, and a setup module that performs setup operation for the driver software that is identified by the identifying module.

12 Claims, 10 Drawing Sheets

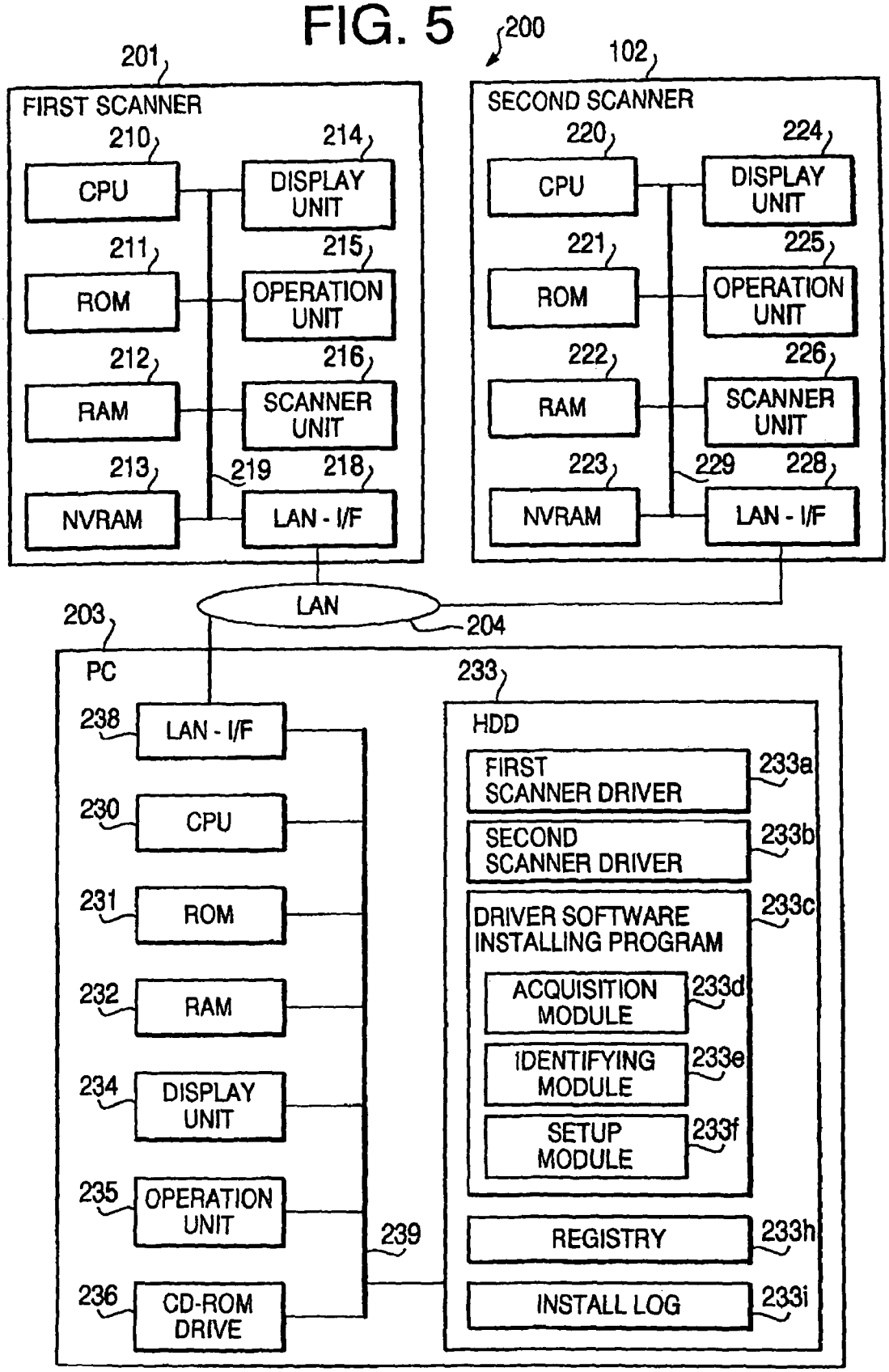

FIG. 6

Setupapi.log

I
[2002/12/06 10:04:00 108.8Driver Install]
Munged cmdline: "E:¥WINNT¥System32¥sticpl.cpl",Scanners and Cameras "E:¥WINNT¥system32¥rundll32.exe" shell32.dll.Control_RunDLl
EXE name:E:¥WINNT¥system32¥rundll32.exe
Enumerating files E:¥twain¥*.inf
Doing full install of ROOT¥IMAGE¥0000.
Installing section BtScanner.NT from E:¥twain¥BT.INF.
Copying file E:¥twain¥Bt.dll to E:¥WINNT¥System32¥Bt.dll
Copying file E:¥twain¥Bt.dll to E:¥WINNT¥System32¥Bt.dll
Copying file E:¥twain¥BT.ds to E:¥WINNT¥TWAIN_32¥Bt¥BT.ds.
Device install finished successfully(ROOT¥IMAGE¥0000).

II
[2002/12/06 14:07:42 652.52Driver Install]
Munged cmdline: "E:¥WINNT¥System32¥sticpl.cpl",Scanners and Cameras "E:¥WINNT¥system32¥rundll32.exe" shell32.dll.Control_RunDLl
EXE name:E:¥WINNT¥system32¥rundll32.exe
Enumerating files E:¥WINNT¥inf¥*.inf
Enumerating files E:¥twain¥*.inf
Doing full install of ROOT¥IMAGE¥0001.
Installing section BtScanner NT from E:¥twain¥BTINF.
Copying file E:¥twain¥Bt.dll to E:¥WINNT¥System32¥Bt.dll
Copying file E:¥twain¥Bt.dll to E:¥WINNT¥System32¥Bt.dll
Copying file E:¥twain¥BT.ds to E:¥WINNT¥TWAIN_32¥Bt¥BT.ds.
Device install finished successfully(ROOT¥IMAGE¥0001).

FIG. 7

```
bt.inf
===========================================
BT Scanner Setup File
Copyright (C) 2002 Bt.
FileName : BT.inf
Function : Image

[Version]
signature="$CHICAGO$"
Class=Image
ClassGUID={6bdd1fc6-810f-11do-bec7-08002be2092f}
provider="BT Scanner"
DriverVer=11/22/2002.01.00.01.00

[Scan]
%BTSCN%=BT-Scn

[BTScanner.NT]
SubClass=StillImage
DeviceType=1
DeviceSubType=0x1
Gapabi l ities=0x1
DeviceData=BTScn.DeviceData
ICMProfiles="sRGB Color Space Profile.icm"
CopyFiles=BtScnCopyList

[BTScn. DeviceData]
TwainDS="BT Scanner"
SetupInit=1

[BTScnCopyList]
BtScn.dll
BTScn.ds

[DestinationDirs]
DefaultDestDir=11
```

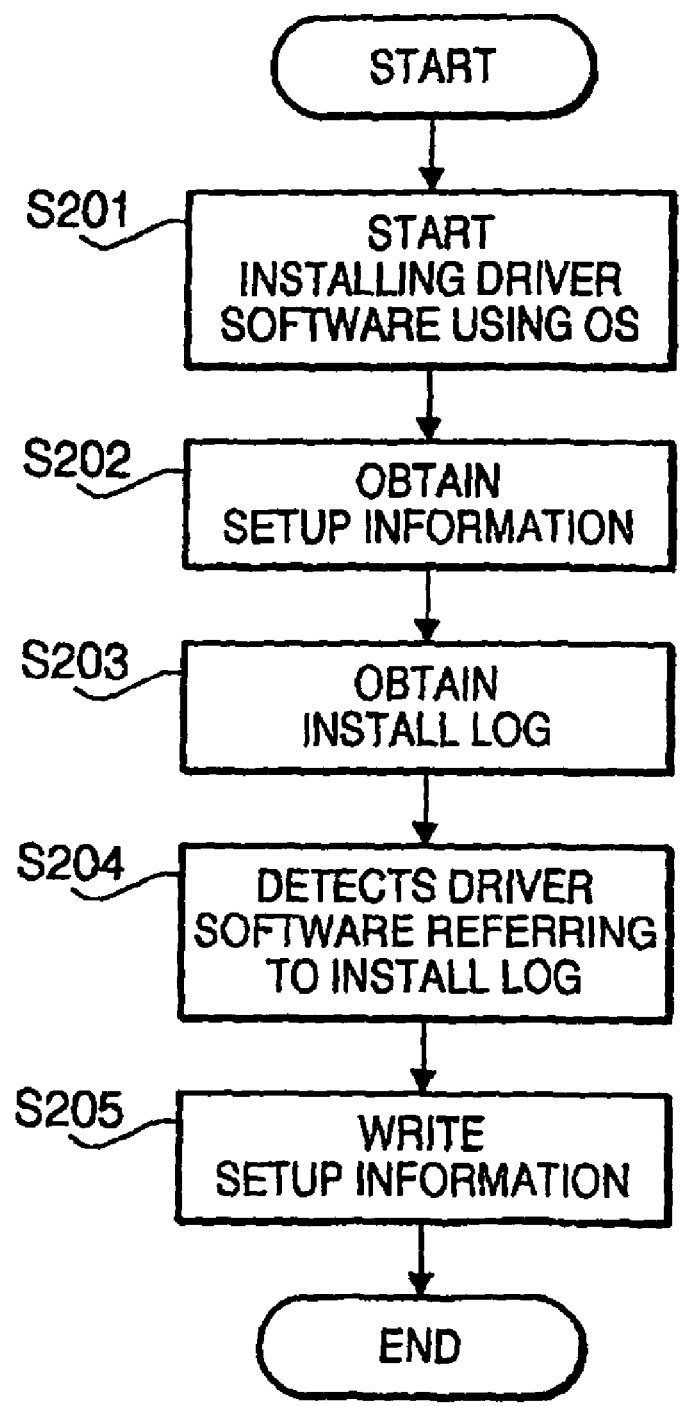

DRIVER SOFTWARE INSTALLING SYSTEM

BACKGROUND OF THE INVENTION

The present invention relates to a driver software installing system, and particularly to such a system that executes a setup procedure after installation of driver software in a computer.

Conventionally, an electronic device having a single or a plurality of functions such as a printer function and image data generating function has been known. Such an electronic device is typically connected directly to a terminal device (hereinafter, such a terminal device is represented by a personal computer) through, for example, a USB (Universal Serial Bus), and/or indirectly connected to the terminal device through a LAN (Local Area Network) using a predetermined protocol such as the TCP/IP (Transmission Control Protocol/Internet Protocol). Generally, driver software for driving such an electronic device should be installed in the personal computer (i.e., the terminal device) with an installation procedure provided by an OS (Operating System) running on the personal computer, and further a setup procedure for making various settings such as a setting related to a network which connects the personal computer and the electronic device, with respect to the driver software installed in the computer should be performed. After the installation and setup procedures have been finished, the electronic device can be remotely operated by the personal computer using the driver software as installed and set up. An example of such a system is disclosed in Japanese Patent Provisional Publication No. HEI 11-110331.

When there are a plurality of electronic devices directly connected to the personal computer and/or there are a plurality of electronic devices connected through the LAN (such a system is also described in the aforementioned Japanese Patent Provisional Publication), installation of a plurality of pieces of driver software for respective electronic devices should be done for the personal computer, and further setup (e.g., setting of IP addresses of the electronic devices when the LAN employs the TCP/IP) of respective pieces of the driver software should be performed.

When the driver software is installed in the personal computer, an installer, which is known as software that semi-automates the installation procedure of driver software in the personal computer is used. It should be noted that the installer includes a first installer which is typically provided by a vender of the electronic device and is annexed to the electronic device, and a second installer which is preliminary incorporated in the OS. The former will be referred to as a vender installer and the latter will be referred to as an OS installer hereinafter. In the following description, the function of the OS installer will be referred to as installation, and the function of the vender installer will be referred to as setup. A verb "install" implies the act of installation, or occasionally includes the act of both the installation and setup of software.

In the installation operation of the driver software using the OS function, firstly the vender installer is started up by the user. Then, the vender installer requests the OS installer for an installation of the driver software. That is, installation of the driver software in the personal computer is performed by the OS installer. Next, setup of the driver software which has been installed in the personal computer is executed by the vender installer. That is, in the conventional system, driver software to be set up is identified by a name of the driver software installed in the personal computer, and the vender driver operates to set up the identified driver software. The name of the driver software was determined by the vender in advance and was set in the vender installer.

When driver software is to be newly installed, if an electronic device corresponding to the driver software to be newly installed is of the same type of an electronic device whose driver software has already been installed in the computer, the name of the driver software which has already been installed may coincide with the name of the driver software to be newly installed. In such a case, when the setup, which immediately follows the installation of the driver software, is executed, it becomes impossible to distinguish one of the driver software from the other since the two pieces of the driver software have the same name. In such a case, the setup operation of the newly installed driver software may not be finished correctly

SUMMARY OF THE INVENTION

The present invention is advantageous in that one of a plurality of pieces of the driver software respectively corresponding to the electronic devices of the same type can be correctly identified, thereby enabling the setup of the driver software to be executed successfully.

According to an aspect of the invention, there is provided a driver software installing system, which is provided with a computer communicatively connected to an electronic device, an installation system that performs installation of driver software in the computer in accordance with a procedure of an operating system of the computer, the driver software enabling the computer to control the electronic device connected to the computer, and a setup system that performs setup of the driver software that is installed in the computer by the driver software installation system. Further, the setup system includes an instructing module that instructs the installation system to generate identification information for identifying the driver software when the installation of the driving software is performed, an identifying module that identifies the driver software to be set up based on the identification information generated by the installation system in response to the instruction of the instructing module, and a setup module that performs setup operation for the driver software that is identified by the identifying module.

In one embodiment, the setup system may include an invalidating module that invalidates the identification information so that the identifying module cannot identify the driver software based on the identification information after the setup module performs the setup operation for the driver software.

In one case, the invalidating module invalidates the identification information by deleting the identification, information. Alternatively, the invalidating module invalidates the identification information by modifying the identification information.

Optionally, the instruction module is configured to instruct the operating system to store the identification information as generated in storage area, provided in a registry, corresponding to the driver software, and the identifying module is configured to detect the identification information which is not invalidated by the invalidating module from the registry and determines the driver software using the storage area where the identification information which is not invalidated is stored as the identified driver software.

In an embodiment, the invalidating module invalidates the identification information before the installation system starts installation of the driver software.

The setup system may include an invalidating module that invalidates the identification information so that the identifying module cannot identify the driver software based on the identification information before the installation system starts installation of the driver software.

According to another aspect of the invention, in the driver software installing system, the setup system may include an acquisition module that obtains an installation log that is created by the operating system when the driver software is installed, an identifying module that identifies the driver software to be set up based on the installation log obtained by the acquisition system, and a setup module that performs setup operation for the driver software that is identified by the identifying module.

Optionally, the installation log includes information related to a storage area occupied by the driver software which is being installed, and the identifying module refers to a latest log included in the installation log obtained by the acquisition module and identifies driver software based on the information related to the storage area included in the latest log.

Further optionally, the installation log may further include at least part of information related to one of contents of an INF file, which is referred to by the operating system when the driver software is installed, and a name of the INF file, and the identifying module may be configured to detect, within the installation log, a log including the at least part of information related to one of contents of an INF file and a name of the INF file, and determines the detected log as the latest log.

According to a further aspect of the invention, in the driver software installing system, the setup system may include a saving module that saves system information of the operating system before the installation of the driver software is performed, a comparing module that compares the system information saved by the saving module with system information updated by the operating system when the installation of the driver software is performed, an identifying module that identifies the driver software to be set up based on a result of comparison performed by the comparing module, and a setup module that performs setup operation for the driver software identified by the identifying module.

Optionally, the system information may include a registry in which a storage area used by the driver software is provided, and the identifying module detects a storage area which was not provided in the registry before the installation of the driver software and is provided in the registry after the installation of the driver software based on the result of the comparison performed by the comparing module, the driver software using the detected storage area being determined as the identified driver software.

The electronic device in each of the systems described above may be an image generating device.

It should be noted that, with a suitable program, a computer communicatively connected with an electronic device may be configured to function as the systems described above.

According to another aspect of the invention, there is provided a method of installing driver software for performing installation of driver software in a computer in accordance with a procedure of an operating system of the computer, the driver software enabling the computer to control the electronic device which is communicatively connected to the computer and setup of the driver software that is installed in the computer. The method includes the steps of instructing to generate identification information for identifying the driver software when the installation of the driving software is performed, identifying the driver software to be set up based on the identification information generated in response to an instruction made in the step of the instructing, and performing a setup operation for the driver software identified in the step of identifying.

Alternatively, the method may include the steps of obtaining an installation log that is created by the operating system when the driver software is installed, identifying the driver software to be set up based on the installation log obtained in the step of, obtaining, and performing a setup operation for the driver software that is identified in the step of identifying.

Further alternatively, the method may include the steps of saving system information of the operating system before the installation of the driver software is performed, comparing the system information saved in the step of saving with system information updated by the operating system when the installation of the driver software is performed, identifying the driver software to be set up based on a result of comparison performed in the step of comparing, and performing a setup operation for the driver software identified in the step of identifying.

The systems and methods according to the present invention can be realized when appropriate programs are provided and executed by a computer. Such programs may be stored in recording medium such as a flexible disk, CD-ROM, memory cards and other similar medium, and distributed. Alternatively or optionally, such programs can be distributed through networks such as the Internet.

BRIEF DESCRIPTION OF THE ACCOMPANYING DRAWINGS

FIG. 1 schematically shows a configuration of a driver software installing system according to a first embodiment of the invention;

Figure 9:
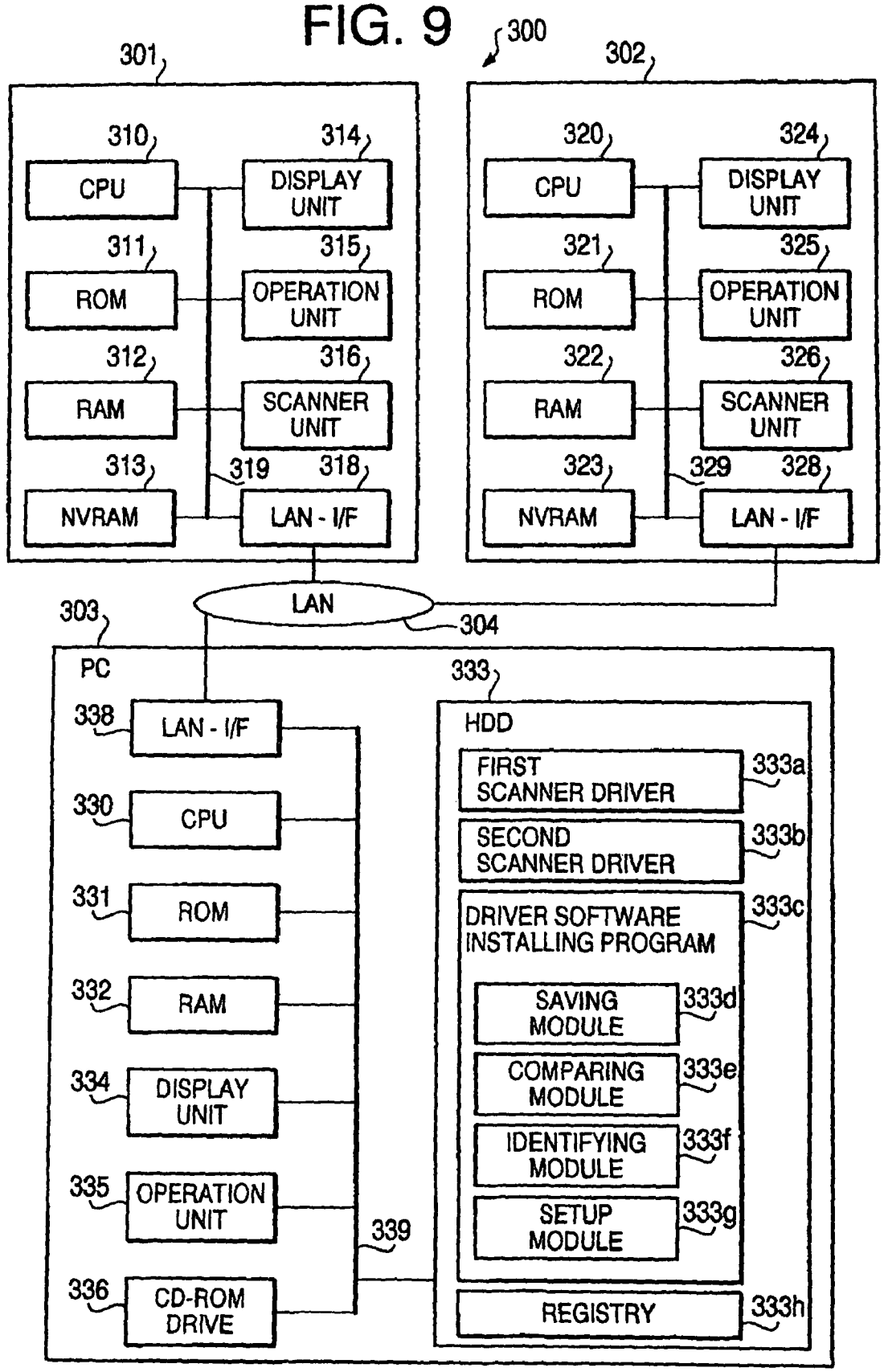
Figure 10:
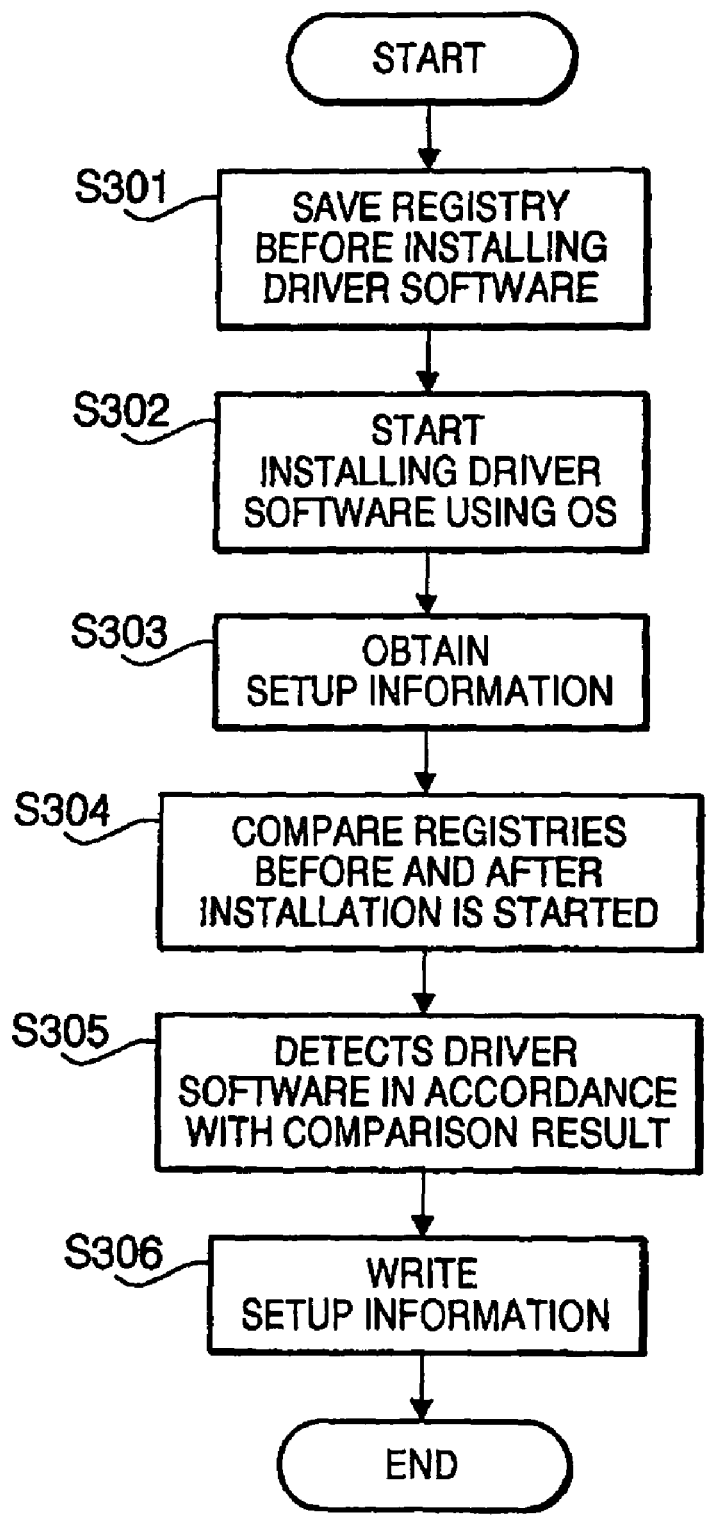

FIG. 5 schematically shows a configuration of a driver software installing system according to a second embodiment of the invention;

FIG. 6 shows contents of an installation log file;

FIG. 7 shows contents of an INF (information) file referred to for installing the driver software;

FIG. 8 is a flowchart illustrating a driver software installing procedure according to the second embodiment;

FIG. 9 schematically shows a configuration of a driver software installing system according to a third embodiment of the invention; and FIG. 10 sa flowchart illustrating a driver software setup procedure according to the third embodiment.

DETAILED DESCRIPTION OF THE EMBODIMENTS

Hereinafter, referring to the accompanying drawings, driver software installing systems according to first through third embodiments of the invention will be described.

First Embodiment

Figure 1:
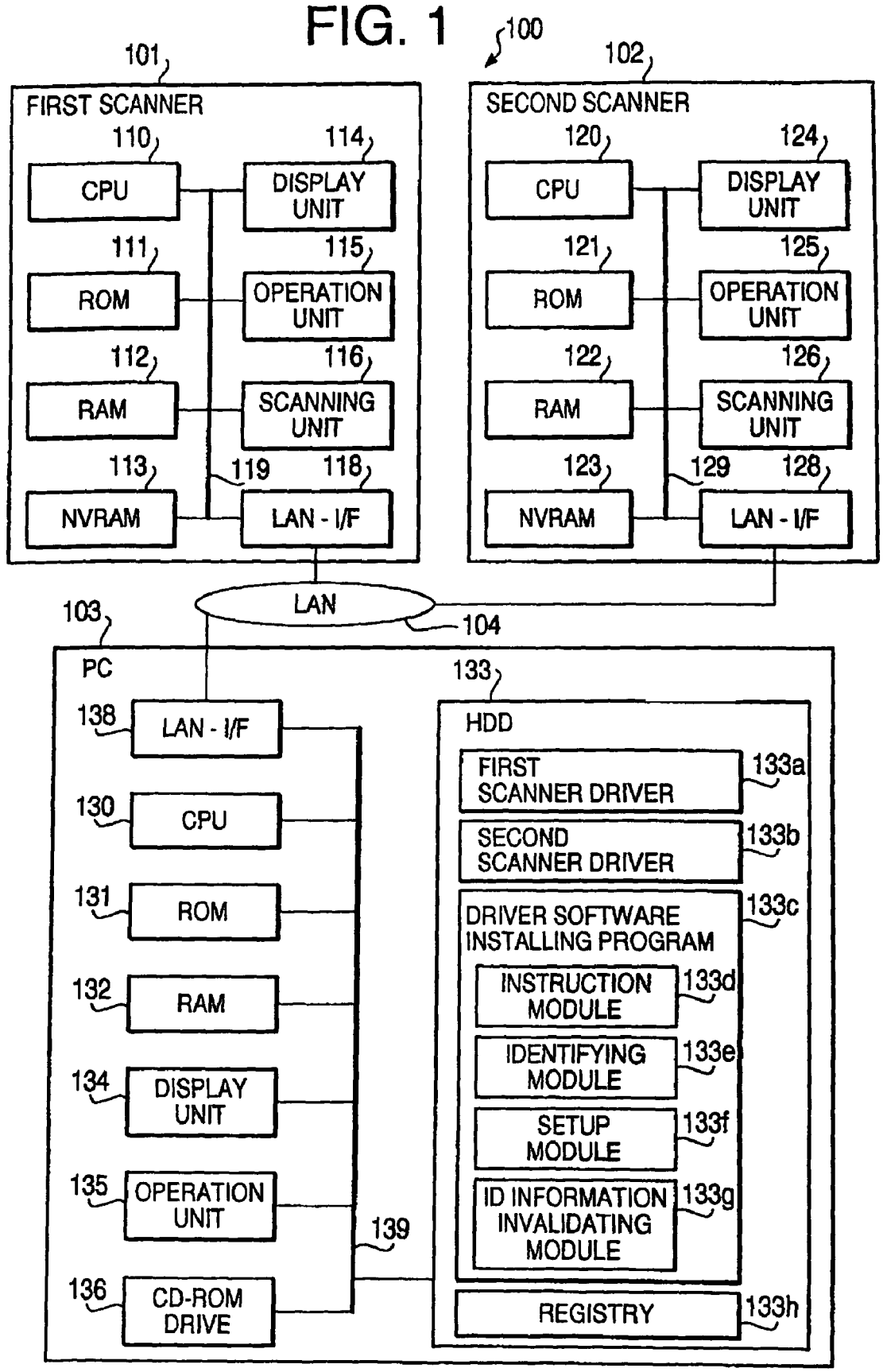
Figure 2:
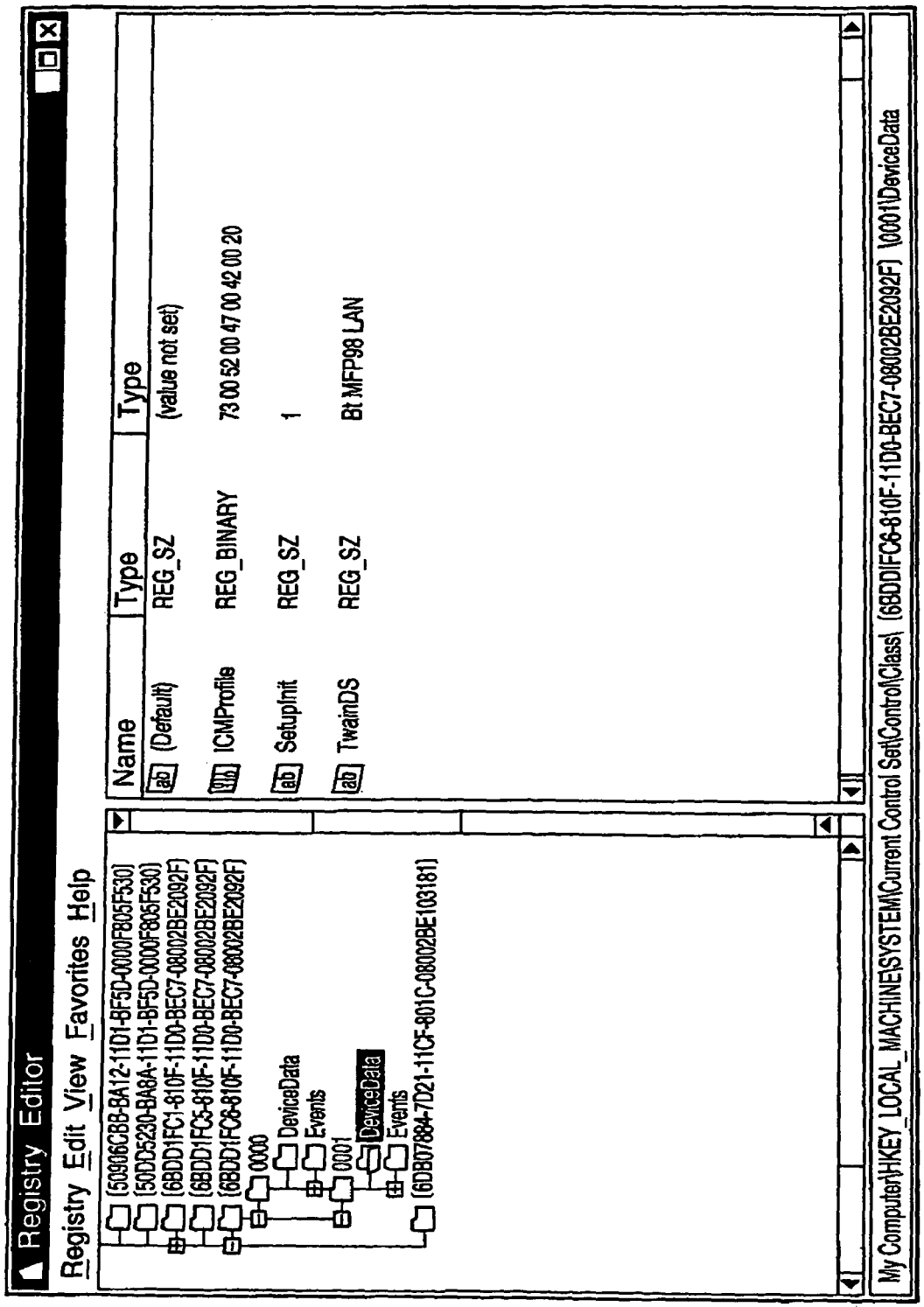
FIG. 2 shows a screen image of a registry editor in which registry information including identification information is indicated.

FIG. 1 schematically shows an exemplary configuration of a driver software installing system 100 according to the first embodiment of the invention. FIG. 2 shows a screen image of a registry editor in which registry information including identification information is indicated.

Figure 3:
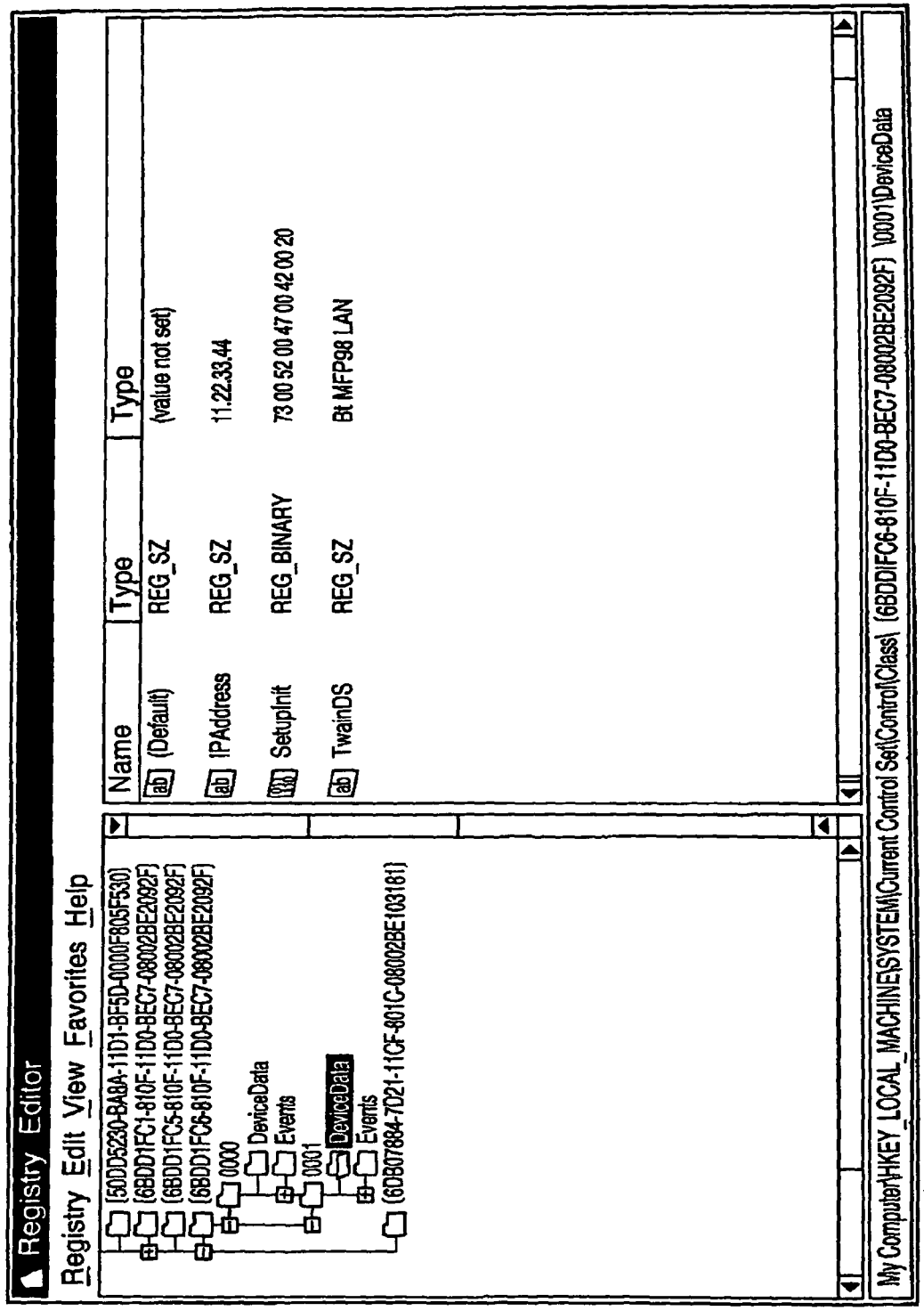
FIG. 3 shows a screen image of the registry editor in which the registry information after a setup operation is indicated.

FIG. 3 shows a screen image of the registry editor in which the registry information after a setup operation has been performed is indicated.

As shown in FIG. 1, the driver software installing system 100 according to the first embodiment includes two electronic devices, which are a first scanner 101 and a second scanner 102, and a personal computer (which will be referred to a PC hereafter) 103. The first scanner 101, the second scanner 102 and the PC 103 are connected to a LAN 104. For the sake of explanation, it is assumed that installation and setup of a first scanner driver 133a, which is driver software for the first scanner 101, has already been executed in the PC 103, and that installation and setup of a second scanner driver 133b, which is driver software for the second scanner 102, will be performed in the PC 103.

The first scanner 101 includes a CPU (Central Processing Unit) 110, a ROM (Read Only Memory) 111, a RAM (Random Access Memory) 112, an NVRAM (Non Volatile RAM) 113, a display unit 114, an operation unit 115, a scanning unit 116 and an LAN I/F (Interface) 118, which are interconnected with each other through a system bus 119.

The CPU 110 controls an entire operation of the first scanner 101. The CPU 110, for example, analyses instructions received from the PC 103 and controls the scanning unit 116 to function.

The ROM 111 is a read only storage, and serves as a part of a main memory space used by the CPU 110. The RAM 112 is a readable/writable volatile memory, which also serves as a part of the main memory space used by the CPU 110. The NVRAM 113 is a non-volatile readable/writable memory, and functions, for example, to store data which is to be rewritten.

The display unit 114 is a displaying device that outputs information in the visual form with use of a display. The display unit 114 is connected with the system bus 119 through an I/O (input/output) interface, which is not shown in the drawing. The display unit 114 is used, for example, to display information related to various functions of the first scanner 101. The display unit 114 includes, for example, an LCD (Liquid Crystal Display) for displaying the information.

The operation unit 115 is an input device which allows a user of the first scanner 101 to input, for example, information related to the function of the first scanner 101. The operation unit 115 is also connected to the system bus 119 through an I/O interface (not shown). The operation unit 115 includes, for example, a key board provided with a plurality of depression keys arranged thereon.

The scanning unit 116 provides an optical scanning function for capturing an image formed on a sheet of paper or film. The scanning unit 116 is also connected with the system bus 119 through an I/O interface (not shown). The scanning unit 116 performs, under control of the CPU 110, an optical scanning operation with respect to an original having an image to be captured thereon and placed on a predetermined scanning position of the first scanner 101 in response to instructions transmitted from the first scanner driver 133a installed in the PC 103 to generate an image data (which may be raster data). The thus generated image data is transmitted to the PC 103 through the LAN 104.

The LAN I/F 118 is connected to a LAN I/F 138 of the PC 103 through the LAN 104. The LAN I/F 118 enables data communication between the first scanner 1.01 and the PC 103, and is used for transmitting the data including the image data (raster data). According to the first embodiment, the first scanner 101 and the PC 103 communicate using TCP/IP as a data communication protocol.

The second scanner 102 includes, as shown in FIG. 1, a CPU 120, a ROM 121, a RAM 122, an NVRAM 123, a display unit 124, an operation unit 125, a scanning unit 126 and a LAN I/F (interface) 128, which are interconnected through a system bus 129.

Since the CPU 120, the ROM 121, the RAM 122, the NVRAM 123, the display unit 124, the operation unit 125 and the LAN I/F 128 function in the similar manner as the CPU 110, the ROM 111, the RAM 112, the NVRAM 113, the display unit 114, the operation unit 115 and the LAN I/F 118, respectively, the description thereof is omitted for the sake of brevity.

The scanning unit 126 provides an optical scanning function for capturing image formed on a sheet of paper or film. The scanning unit 126 is also connected with the system bus 129 through an I/O interface (not shown). The scanning unit 126 performs, under control of the CPU 120, an optical scanning operation with respect to an original having an image to be captured thereon and placed on a predetermined scanning position of the second scanner 102 in response to instructions transmitted from the second scanner driver 133b, which is to be installed in the PC 103, to generate an image data (which may be raster data). The thus generated image data is transmitted to the PC 103 through the LAN 104.

The PC 103 includes, as shown in FIG. 1, a CPU 130, a ROM 131, a RAM 132, an HDD (Hard Disk Drive) 133, a display unit 134, an operation unit 135, a CD-ROM drive 136 and a LAN I/F 138, which are interconnected with each other through a system bus 139 the PC 103 employs Microsoft Windows® as its OS (Operating System).

The CPU 130 controls an entire operation of the PC 103. The CPU 130 is capable of transmitting a command to the first scanner 101 and/or the second scanner 102 to start the scanning operation. The CPU 130 is capable of retrieving driver software installing program 133c, for example, from the HDD 133 and executes the retrieved program (e.g., the driver software installing program). The driver software installing program 133c will be described in detail later.

The ROM 131 is a read only memory, which serves as a part of a main memory space used by the CPU 130. For example, a boot program for starting up the OS of the PC 103 is stored in the ROM 131. The RAM 132 is a readable/writable memory, which also serves as a part of the main memory space used by the CPU 130.

The HDD 133 is a readable/writable storage (i.e., a hard disk) and a reading/writing device of the hard disk. The HDD 133 stores, for example, the first scanner driver 133a, the second scanner driver 133b (after it is installed), a driver software installing program 133c and a registry 133h. The HDD 133 also stores image data (raster data) transmitted from the first scanner 101 and/or the second scanner 102.

The registry 133h is a database for central control of any setup information including the information of setup of the device drivers and the set up of the application under control of Microsoft Windows® (e.g., Windows 2000®, Windows XP®, Windows ME®, Windows 98®) which serves as the OS. The plurality of pieces of the driver software occupy, in the registry 133h, respective storage areas. Thus, the setup information of the first scanner driver 133a and the second scanner driver 133b are/will be stored in the storage areas of the registry 133h assigned to the first scanner driver 133a and the second scanner driver 133b, respectively.

The first scanner driver 133a enables the PC 103 to connect with the first scanner 101. The first scanner driver 133a is provided by a vender of the first scanner 101 as driver software of the first scanner 101. According to the first embodiment, the first scanner driver 133a has been installed in the HDD 133 of the PC 103 by a user, and setup information of the first scanner driver 133a is stored the storage area of the registry 133h occupied by the first scanner driver 133a.

The second scanner driver 133b enables the PC 103 to connect with the second scanner 102. The second scanner driver 133b is also provided by a vender of the second scanner 102 as driver software of the second scanner 102. According to the first embodiment, installation and setup of the second scanner driver 133b is to be executed using the driver software installing program 133c (described later).

Figure 4:
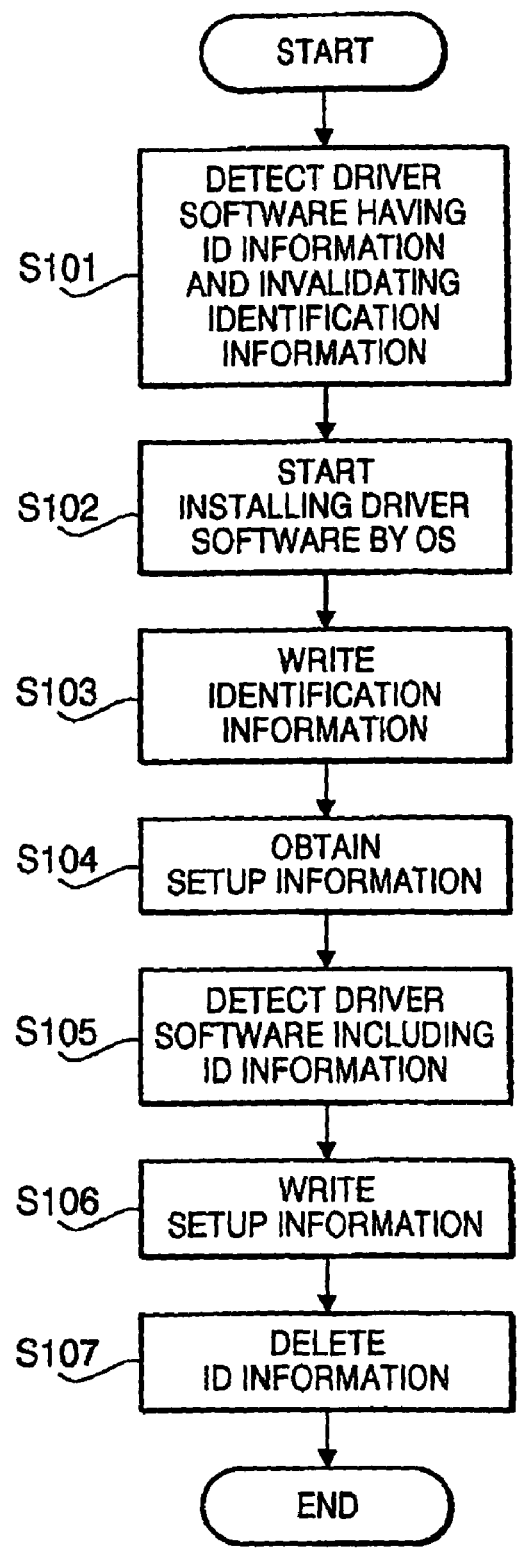
FIG. 4 is a flowchart illustrating a driver software installing procedure according to the first embodiment of the invention.

The driver software installing program 133c is a program including one or a plurality of pieces of software which constitute a part of or all of the vender installer that semi-automates the installation and setup procedures for the second scanner driver 133b. The driver installing program 133c is illustrated in FIG. 4, and will be described later. It should be noted that the driver software installing program 133c is provided by the vender of the second scanner 102 in association with the second scanner driver 133b. The driver software installing program 133c includes, as shown in FIG. 1, an instruction module 133d, an identification module 133e, a setup module 133f and an ID information invalidating module 133g.

The instruction module 133d instructs the OS installer to generate identification information used for identifying the second scanner driver 133b which is installed during the installation procedure. Specifically, the instruction module 133d has the following instruction commands at a "Driver AddReg Section" of an INF file, which is a part of the driver software installing program 133c (i.e., which is a file referred to by the OS installer when the second scanner driver 133b is installed).

[Bt.DeviceData]
SetupInit=1

With the above commands being provided in the INF file, when the OS installer performs the installation procedure of the second scanner driver 133b, a [SetupInit] key is generated in a "Device Data" section of a storage area, in the registry 133h, occupied by the second scanner driver 133b, and a value "1" is written as the value of the [SetupInit] key. FIG. 2 is a window of a registry editor, which is a program for editing the registry 133h. The storage area, in the registry 133h, for the second scanner driver 133b is determined by the OS. In the example of FIG. 2, the storage area is "My Computer¥HKEY_LOCAL_MACHINE¥SYSTEM¥ CurrentControlSet¥Control¥Class¥[68DD1FC6-810F-11D0-BEC7-08002BE2092F]¥0001". It should be noted that, in this example, to have the key [SetupInit] is to have the identification information, but not the value of the [SeupInit] key. That is, when the [SetupInit] key is included in the storage area, the storage area is regarded as the area having the identification information.

The identification module 133e identifies the second scanner driver 133b which is being installed based on the identification information generated by the instruction module 133d. Specifically, the identification module 133e searches for the driver software having the storage area, in the registry 133h, which includes the "Device Data" having the [SetupInit] key therein. The identification module 133e then determines the thus identified driver software, which has the [SetupInit] key in the "Device Data", as the second scanner driver 133b which is being installed.

The setup module 133f performs the setup operation with respect to the second scanner driver 133b, which is identified by the identification module 133e as the second scanner driver 133b that is being installed. Specifically, the setup module 133f writes setup information (e.g., an IP address) of the second scanner 102 which is input, by a user, through the operation unit 135 during the procedure of the driver software installation program 133c in the storage area of the registry 133h occupied by the second scanner driver 133b as a value of a key. For example, when "11.22.33.44" is input as the IP address of the second scanner 102, as shown in a window of the registry editor shown in FIG. 3, the input IP address "111.22.33.44" is written as a value of an [IPAddress] key in the "Device Data" within the storage area occupied by the second scanner driver 133b.

The ID information invalidating module 133g invalidates the identification information by deleting or modifying the same after the setup of the second scanner driver 133b has been finished so that the driver software (i.e., the second scanner driver 133b) will not be identified by the identification module 133e any longer. For example, the ID information invalidating module 133g deletes the [SetupInit] key of the "Device Data" section in the storage area occupied by the second scanner driver 133b, which key was created in the registry 133h in response to the instruction by the instruction module 133d.

It should be noted that the invalidation of the ID information may be done in different ways. For example, the identification module 133e may be configured such that the identification is the fact that the value of the [SetupInit] key is [1] (one), rather than the existence of such a key. In such a case, if the ID information invalidating module 133g modifies the value of the [SetupInit] key, for example, to [0] (zero) or [2] (two), the ID information is invalidated.

The ID information invalidating module 133g may optionally be configured to invalidate the ID information before the installation procedure is started so that only one ID information becomes effective after the installation of the driver software is started. For example, when there is the [SetupInit] key in the "Device Data" section within the storage area of the registry 133h occupied by the first scanner driver 133a, the ID information invalidating module 133g deletes the [SetupInit] key of the "Device Data" section of the storage area occupied by the first scanner driver 133a before the installation of the second scanner driver 133b is started.

The display unit 134 displays various information (e.g., information related to various functions of the PC 103) on a display device, which may be a CRT (Cathode Ray Tube) display or the LCD. The display unit 134 is connected with the system bus 139 through an I/O interface (not shown).

The operation unit 135 is an input device of the PC 103 for allowing the user to input information and/or commands including information related to various functions of the PC 103. The operation unit 135 is also connected with the system bus 139 through an I/O interface (not shown). The operation unit 135 includes, as inputting devices, a mouse and a keyboard.

The CD-ROM drive 136 is a device for retrieving data recorded on a CD (Compact Disc). The CD-ROM drive 136 is connected with the system bus 139 through an I/O interface (not shown) It should be noted that the CD-ROM drive 136 is not an essential component of the PC 103 in view of the invention, and it may be omitted or replaced with a floppy® disk (FD) drive or an MO (Magneto-Optical) disk drive.

The LAN I/F 138 connects the PC 103 with the LAN I/F 118 of the first scanner 101 or the LAN I/F 128 of the second scanner 102 through the LAN 104 so that the data communication (e.g., transmission of the raster data) therebetween is enabled.

Next, referring to FIG. 4, the installation and setup of the driver software (i.e., the second scanner driver 133b) executed in the driver installing system 100 according to the first embodiment will be described.

FIG. 4 is a flowchart illustrating a driver software installing procedure. In response to the user's predetermined operation, the CPU 130 of the PC 103 retrieves the driver software installing program 133c from the HDD 133 and executes the same.

When the driver software installing program 133c is started by the user, the ID information invalidating module 133g searches for the driver software including the identification information, and invalidates the identification information by deleting (or modifying) the same so that the driver software having been installed will not be identified by the identification module 133e during the installation and setup of the new driver software (i.e., the second scanner driver 133b in this example) (S101). Specifically, the ID information invalidating module 133g searches the storage areas assigned to the respective driver software for the identification information (i.e., [SetupInit] key), and when such driver software is found, the ID information invalidating module 133g deletes the [SetupInit] key.

Next, the driver software installing program 133c instructs the OS installer to start the installation of the second scanner driver 133b, and then, the installation of the second scanner driver 133b in the PC 103 by the OS installer is started (S102). When the installation is started, the instruction module 133d instructs the OS installer to create the identification information for identifying the second scanner driver 133b, which is currently installed, during the installation of the second scanner driver 133b (S103). For example, since there is an instruction to create the identification information at the "Driver AddReg Section" of the INF file, which is a part of the driver software installing program 133c as aforementioned, the OS installer creates the [SetupInit] key in the "Device Data" section in the storage area occupied by the second scanner driver 133b, and sets the value thereof to "1" (one) (see FIG. 2).

When the installation of the second scanner driver 133b by the OS installer is finished, the second scanner driver 133b is stored in the HDD 133 of the PC 103, and the OS installer notifies the driver software installing program 133c of the completion of the installation. Then, the driver software installing program 133c instructs the display unit 134 to display a window asking the user to input setup information for the second scanner driver 133b. Then the driver software installing program 133c obtains the setup information (e.g., the IP address) regarding the second scanner driver 133b is input by the user through the operation unit 135 (S104).

After the setup information for the second scanner driver 133b is obtained, the identification module 133e identifies the second scanner driver 133b having the identification information (S105). For example, the identification module 133e searches the registry 133h for the [SetupInit] key included in the "Device Data" section, the identifies the driver software which has the [SetupInit] key in the "Device Data" section as the second scanner driver 133b, the installation of which has been performed.

In S106, the setup module 133f writes the setup information with respect to the second scanner driver 133b that is identified by the identification module 133e. Specifically, the setup module 133f writes the information related to the second scanner driver 133b obtained in S104 (e.g., the IP address of the second scanner 102) as a value of a corresponding key (e.g., an [IPAddress] key in the "Device Data") in the storage area of the registry 133h, which area is occupied by the second scanner driver 133b (see FIG. 3).

Lastly, the ID information invalidating module 133g invalidates the identification information for the second scanner driver 133b by deleting or modifying the same so that the identification module 133e will not identify the same driver software any more (S107). For example, the ID information invalidating module 133g deletes the [SetupInit] key in the storage area of the registry 133h occupied by the second scanner driver 133b.

As above, with the driver software installing system 100 according to the first embodiment of the invention, when the installation of the second scanner driver 133b is executed by the OS installer, the instruction module 133d instructs the OS installer to store the identification information for identifying the currently installed second scanner driver 133b in the storage area of the registry 133h occupied by the currently installed second scanner driver 133b (S103). With this operation, the identification module 133e can identify the currently installed second scanner driver 133b by detecting the identification information from the registry 133h. Thus, it becomes possible to distinguish the currently installed driver software (e.g., the second scanner driver 133b) from the previously installed driver software (e.g., the first scanner driver 133a). As a result, the setup module 133f can execute the setup of the second scanner driver 133b correctly since the second scanner driver 133b to be set up is correctly identified.

The ID information invalidating module 133g invalidates the identification information (by deleting or modifying the same) when the setup module 133f has completed the setup of the second scanner driver 133b and the identification information becomes unnecessary. Therefore, the second scanner driver 133b is once installed, it will not be identified as the driver software to be set up, and installing procedures thereafter will be executed similarly.

According to the first embodiment, the ID information invalidating module 133g invalidates the identification information before the OS installer starts installation of the second scanner driver 133b (S101) so that wrong driver software will not be identified during the following setup operation. With this configuration, after the installation of the second scanner driver 133b, only one piece of driver software (i.e., the second scanner driver 133b) is identified as the currently installed driver. Therefore, even if a hang-up of the PC 103 occurs in the midst of the setup of the driver software, only one piece of identification information remains, and the setup can be resumed after the recovery of the PC 103.

For the driver software of the scanners (e.g., the first scanner driver 133a and the second scanner driver 133b), unlike the printer driver software, the OS doe not support the installation thereof sufficiently. Therefore, if the driver software was installed in the past and the driver software newly installed have the same name, the installer cannot distinguish one from the other. In accordance with the first embodiment, it becomes possible that the newly installed driver software is distinguished from the previously installed software regardless of the names thereof, and the setup of the new software can be performed correctly.

It should be noted that, in the above embodiment and following embodiments, the installation and set up of the driver software of the scanner is explained. However, the invention is not limited to the embodiments, but can be applied to driver software installing system for various types of electronic devices.

Second Embodiment

Next, a driver software installing system 200 according to the second embodiment will be described. FIG. 5 schematically shows a configuration of the driver software installing system 200 according to the second embodiment of the invention. FIG. 6 shows contents of an installation log file, and FIG.

7 shows contents of an INF (information) file referred to when the driver software is installed.

As shown in FIG. 5, the driver software installing system 200 according to the second embodiment includes two electronic devices, which are a first scanner 201 and a second scanner 202, and a PC 203. The first scanner 201, the second scanner 202 and the PC 203 are connected to a LAN 204. For the sake of explanation, it is assumed that installation and setup of a first scanner driver 233a, which is driver software for the first scanner 201, has already been performed in the PC 203, and that installation and setup of a second scanner driver 233b, which is driver software for the second scanner 202, will be performed in the PC 203.

The first scanner 201 includes a CPU 210, a ROM 211, a RAM 212, an NVRAM 213, a display unit 214, an operation unit 215., a scanning unit 216 and an LAN I/F 218, which are interconnected with each other through a system bus 219.

The CPU 210 controls an entire operation of the first scanner 201. The CPU 210, for example, analyses instructions received from the PC 203 and controls the scanning unit 216 to function.

The ROM 211, the RAM 212, the NVRAM 213, the display unit 214 and the operation unit 215 are configured similarly to the ROM 111, the RAM 112, the NVRAM 113 and the display unit 114 according to the first embodiment, and detailed description thereof will not be provided.

The scanning unit 216 provides an optical scanning function for capturing image formed on a sheet of paper or film. The scanning unit 216 is connected with the system bus 219 through an I/O interface (not shown). The scanning unit 216 performs, under control of the CPU 210, an optical scanning operation with respect to an original having an image to be captured thereon and placed on a predetermined scanning position of the first scanner 201 in response to instructions transmitted from the first scanner driver 233a installed in the PC 203 to generate an image data (which may be raster data). The thus generated image data is transmitted to the PC 203 through the LAN 204.

The LAN I/F 218 is connected to a LAN I/F 238 of the PC 203 through the LAN 204. The LAN I/F 218 enables data communication between the first scanner 201 and the PC 203, and is used for transmitting the data including the image data (raster data). According to the second embodiment, the first scanner 201 and the PC 203 communicate using TCP/IP as a data communication protocol.

The second scanner 202 includes, as shown in FIG. 5, a CPU 220, a ROM 221, a RAM 222, an NVRAM 223, a display unit 224, an operation unit 225, a scanning unit 226 and a LAN I/F (interface) 228, which are interconnected through a system bus 229.

Since the CPU 220, the ROM 22.1, the RAM 222, the NVRAM 223, the display unit 224, the operation unit 225 and the LAN I/F 228 function in the similar manner as the CPU 210, the ROM 211, the RAM 212, the NVRAM 213, the display unit 214, the operation unit 215 and the LAN I/F 218, respectively, the description thereof is omitted for the sake of brevity.

The scanning unit 226 provides an optical scanning function for capturing image formed on a sheet of paper or film. The scanning unit 226 is also connected with the system bus 229 through an I/O interface (not shown). The scanning unit 226 performs, under control of the CPU 220, an optical scanning operation with respect to an original having an image to be captured thereon and place on a predetermined scanning position of the first scanner 201 in response to instructions transmitted from the second scanner driver 233b, which will be installed in the PC 203 to generate an image data (which may be raster data). The thus generated image data is transmitted to the PC 203 through the LAN 204.

The PC 203 includes, as shown in FIG. 5, a CPU 230, a ROM 231, a RAM 232, an HDD 233, a display unit 234, an operation unit 235, a CD-ROM drive 236 and a LAN I/F 238, which are interconnected with each other through a system bus 229 the PC 203 employs Microsoft Windows® as its OS.

The CPU 230 controls an entire operation of the PC 203. The CPU 230 is capable of transmitting a command to the first scanner 201 and/or the second scanner 202 to start the scanning operation. The CPU 230 is capable of retrieving driver software installing program 233c, for example, from the HDD 233 and executes the retrieved program (e.g., the driver software installing program). The driver software installing program 233c will be described in detail later.

The ROM 231 and the RAM 232 are similar to the ROM 131 and the RAM 131 of the first embodiment, respectively, and description thereof will not be repeated.

The HDD 233 is a readable/writable storage (i.e., a hard disk) and a reading/writing device of the hard disk. The HDD 233 stores, for example, the first scanner driver 233a, the second scanner driver 233b, a driver software installing program 233c, a registry 233h and an installation log 233i. The HDD 233 also stores image data (raster data) transmitted from the first scanner 101 and/or the second scanner 202.

The registry 233h is a database for central control of any setup information including the information of setup of the device drivers and the set up of the application under control of Microsoft Windows® (e.g., Windows 2000®, Windows XP®, Windows ME®) which serves as the OS. The plurality of pieces of the driver software occupy, in the registry, respective storage areas. Thus, the setup information of the first scanner driver 233a and the second scanner driver 233b is stored in the storage areas assigned, in the registry 233h, to the first scanner driver 233a and the second scanner driver 233b, respectively.

An installation log 233i is a log of an installation history, which is created/updated by the OS in a log file. In particular, according to the second embodiment, the installation log 233i is defined as a described record of installing operation, from a start of installing of a piece of driver software to the end thereof. The installation log 233i is stored in the HDD 233 as a log file.

The installation log 233i stores, as the installation history information regarding the storage areas of the registry 233h occupied by the driver software and at least part of information regarding the contents and/or name of an INF file which is referred to by the OS when the driver software is installed. Specifically, as the installation log 233i in connection with a first scanner driver 233a and the second scanner driver 233b described later, the storage areas of the registry 233h occupied by the first scanner driver 233a and the second scanner driver 233b and at least part of information regarding the contents and/or name of an INF file, which is referred to by the OS when the first scanner driver 233a and the second scanner driver 233b was/is installed, are stored. In the second embodiment, the INF file, which is referred to by the OS when the second scanner driver 233b is installed (described later), is a part of the vender installer.

The first scanner driver 233a enables the PC 203 to connect with the first scanner 201. The first scanner driver 233a is provided by a vender of the first scanner 201 as driver software of the first scanner 201. According to the second embodiment, the first scanner driver 233a has been installed in the HDD 233 of the PC 203 by a user. The information regarding the storage area of the registry 233h occupied by the first scanner driver 233a, and at least part of description and/or name of the INF file referred to by the OS when the first scanner driver 233a was installed is stored in the installation log 233i.

The second scanner driver 233b enables the PC 203 to connect with the second scanner 202. The second scanner driver 233b is provided by a vender of the second scanner 202 as driver software of the second scanner 202. According to the second embodiment, installation and setup of the second scanner driver 233b is to be executed by the driver software installing program 233c (described later).

The driver software installing program 233c is a program including one or a plurality of pieces of software which constitute a part of or all of the vender installer that semi-automates the installation and setup procedures for the second scanner driver 233b. The driver software installing program 233c is illustrated in FIG. 8, and will be described later. It should be noted that the driver software installing program 233c is provided by the vender of the second scanner 202 in association with the second scanner driver 233b. The driver software installing program 233c includes, as shown in FIG. 5, an acquisition module 233d, an identification module 233e and a setup module 233f.

The acquisition module 233d obtains the installation log 233i which is updated by the OS when the second scanner driver 233b is installed. For example, the acquisition module 233d obtains a Setupapi.log (or SetupLog.txt), which is the log file updated by the OS when the second scanner driver 233b is installed. That is, when the second scanner driver 233b is installed, a log of the installing operation of the second scanner driver 233b is incorporated in the file (e.g., Setupapi.log).

The identification module 233e identifies the second scanning driver 233b to be set up by a setup module 233f based on the installation log 233i obtained by the acquisition module 233d. Specifically, the identification module 233e searches for the installation log 233i including at least part of information regarding the contents of the INF file or the name of the INF file. Then, referring to the latest installation log 233i within the obtained installation log 233i, information indicative of the storage area of the registry 233h indicated in the latest installation log 233i is obtained. Then, the identification module 233e identifies the driver software occupying the storage area of the registry 233h as the second scanner driver 233b subject to be set up by the setup module 233f.

For example, the identification module 233e refers to the log file "Setupapi.log" which is obtained by the acquisition module 233d (see FIG. 6) and searches for the installation log 233i recorded in the "Setupapi.log" and including the name "bt.inf" of the INF file, which is referred to by the OS when the second scanner driver 233b is installed, and a section name "BtScanner.NT". It should be noted that an installation log 233i for one piece of driver software starts with a line labeled with "Driver Install" and ends with a line labeled with "Device install finished" as shown in FIG. 6. Therefore, the identification module 233e search the section starting with "Driver Install" and ends with "Device Install Finished" for the INF file name "bt.inf" and the section name "BtScanner.NT". In the INF file, an example of which is shown in FIG. 7, the term "section" means a description area starting with a name sandwiched with brackets "[ ]", wherein the name in the brackets represents the name of the section.

Next, among the installation logs 233i obtained by the search, the latest installation log 233i is referred to. In the example shown in FIG. 6, each of blocks labeled as "I" and "II" is the installation log 233i which includes the INF file name "bt.inf" and the section name "BtScanner.NT" between the line including "Driver Install" and the line including "Device Install Finished". In this example, the block (i.e., the installation log 233i) "II" at the last part of the log file is the latest installation log 233i, and therefore the block "II" is referred to.

Then, based on the information regarding the storage area in the registry 233h indicated in the latest installation log 233i, the driver software that occupies the storage area of the registry 233h indicated in the latest installation log 233i is identified as the second scanner driver 233b to be set up by the setup module 233f.

More specifically, the following procedure is executed. Firstly, from a portion "Device Install Finished successfully (ROOT¥IMSGE¥0001)", information (i.e., "0001") regarding the storage area in the registry 233h is obtained. The storage areas in the registry 233h of the first scanner driver 233a and the second scanner driver 233b are determined by the OS. In the example shown in FIG. 2, the storage areas are in a directory "My Computer¥HKEY_LOCAL_MACHINE¥SYSTEM¥CurrentControlSet¥Control¥Class¥[68DD1FC6-810F-11D0-BEC7-08002BE2092F]. In this case, the driver software using the storage area under a directory "¥0001" is identified as the storage area of the second scanner driver 233b to be set up by the setup module 233f.

It should be noted that the log located at the last part of the log file is determined as the latest installation log 233i. Alternatively, the latest installation log 233i may be determined based on time information on the line including "Driver Install". That is, the installation log 233i having the time information which is the closest to the current time can be determined as the latest installation log.

The setup module 233f performs the setup operation with respect to the second scanner driver 233b, which is identified by the identification module 233e as the second scanner driver 233b being installed. For example, the setup module 233f writes setup information (e.g., an IP address) of the second scanner 202 input, by a user, through the operation unit 235 during the procedure of the driver software installation program in the storage area of the registry 233h occupied by the second scanner driver 233b as a value of a key. For example, when "11.22.33.44" is input as the IP address of the second scanner 202, as shown in a window of the registry editor shown in FIG. 3, the input IP address "11.22.33.44" is written as a value of an [IPAddress] key in the "Device Data" within the storage area occupied by the second scanner driver 233b.

The display unit 234, the operation unit 235, the CD-ROM drive 236 and the LAN I/O 238 are similar to the display unit 134, the operation unit 135, the CD-ROM drive 136 and the LAN I/F 138 of the first embodiment, respectively, and the description thereof will be omitted.

Next, referring to FIG. 8, the installation and setup of the driver software (i.e., the second scanner driver 233b) executed in the driver software installing system 200 according to the second embodiment will be described.

FIG. 8 is a flowchart illustrating a driver software installing procedure. In response to the user's predetermined operation, the CPU 230 of the PC 203 retrieves the driver software installing program 233c from the HDD 233 and executes the same.

When the driver software installing program 233c is started by the user, the driver software installing program 233c instructs the OS installer to start the installation of the second scanner driver 233b, and then, the installation of the second scanner driver 233b in the PC 203 by the OS installer is started (S201).

When the installation of the second scanner driver 233b by the OS installer is finished, the second scanner driver 233b is stored in the HDD 233 of the PC 203, and the OS installer notifies the driver software installing program 233c of the completion of the installation. Then, the driver software installing program 233c instructs the display unit 234 to display a window for inputting setup information for the second scanner driver 233b. Then the driver software installing program 233c obtains the setup information (e.g., the IP address) regarding the second scanner driver 233b input by the user through the operation unit 235 (S202).

Next, the identification module 233e identifies, the second scanner driver 233b subject to be set up by the setup module 233f based on the installation log 233i obtained by the acquisition module 233d (S204).

In S206, the setup module 233f writes the setup information with respect to the second scanner driver 233b that is identified by the identification module 233e. For example, the setup module 233f writes setup information (i.e., the IP address) related to the second scanner 202, which is input by the user through the operation unit 235 during the execution of the driver software installing program 233c, as the value of a key in the storage area of the registry 233h occupied by the second scanner driver 233b (see FIG. 3).

As above, with the driver software installing system 200 according to the second embodiment of the invention, when the installation of the second scanner driver 233b is executed by the OS installer, the installation log (e.g., Setupapi.log in FIG. 6) including the information regarding the storage area of the registry 233h occupied by the second scanner driver 233b is obtained (S203). Then, the identification module 233e identifies the second scanner driver 233b corresponding to the latest installation log (i.e., the block "II" in FIG. 6). Specifically, the identification module 233e obtains the information of the storage area of the registry occupied by the second scanner driver 233b (i.e., "0001" on the line including "Device install finished successfully (ROOT¥IMAGE¥0001)" in block "II" of FIG. 6) and identifies the second scanner driver 233b subject to be set up. With this configuration, the second scanner driver 233b can be distinguished from the previously installed driver software (e.g., the first scanner driver 233a). As a result, the setup module 233f can execute the setup of the second scanner driver 233b correctly since the second scanner driver 233b to be set up is correctly identified.

Further, the identification module 233e refers to the log file "Setupapi.log" which is obtained by the acquisition module 233d (see FIG. 6) and searches the installation logs recorded in the "Setupapi.log" for an installation log 233i including the name "bt.inf" (which is the INF file referred to by the OS when the second scanner driver 233b is installed) and a section name "BtScanner.NT". Then, based on the information (i.e., "0001" on the line including "Device install finished successfully (ROOT¥IMAGE¥000)" in the block "II" in FIG. 6 regarding the storage area in the registry 233h indicated in the latest installation log 233i (i.e., block "II" in FIG. 6), the driver software that occupies the storage area of the registry 233h indicated in the latest installation log 233i is identified as the second scanner driver 233b to be set up by the setup module 233f (S205).

With this configuration, even if the installation log of the second scanner driver 233b is not the latest one of all the installation logs stored in the installation log 233i (e.g., when a printer installation log is included and it is the latest log in the installation log 233i), the second scanner driver 233b is correctly identified so that the setup module 233f can make the setup with respect to the second scanner driver 233b correctly (S208).

Third Embodiment

FIG. 9 schematically shows an exemplary configuration of a driver setup system 300 according to the third embodiment of the invention.

As shown in FIG. 9, the driver software installing system 300 according to the third embodiment includes two electronic devices, which are a first scanner 301 and a second scanner 302, and a PC 303. The first scanner 301, the second scanner 302 and the PC 303 are connected to a LAN 304. For the sake of explanation, it is assumed that installation and setup of a first scanner driver 333a, which is driver software for the first scanner 301, has already been installed in the PC 303, and that installation and setup of a second scanner driver 333b, which is driver software for the second scanner 302, will be installed in the PC 303.

The first scanner 301 includes a CPU 310, a ROM 311, a RAM 312, an NVRAM 313, a display unit 314, an operation unit 315, a scanning unit 316 and an LAN I/F 318, which are interconnected with each other through a system bus 319.

The CPU 310 controls an entire operation of the first scanner 301. The CPU 310, for example, analyses instructions received from the PC 303 and controls the scanning unit 316 to function.

The ROM 311, the RAM 312, the NVRAM 313, the display unit 314 and the operation unit 315 are configured similarly to the ROM 111, the RAM 112, the NVRAM 113 and the display unit 114 according to the first embodiment, and detailed description thereof will not be provided.

The scanning unit 316 provides an optical scanning function for capturing image formed on a sheet of paper or film. The scanning unit 316 is connected with the system bus 319 through an I/O interface (not shown). The scanning unit 316 performs, under control of the CPU 310, an optical scanning operation with respect to an original having an image to be captured thereon and placed on a predetermined scanning position of the first scanner 301 in response to instructions transmitted from the first scanner driver 333a installed in the PC 303 to generate an image data (which may be raster data). The thus generated image data is transmitted to the PC 303 through the LAN 304.

A LAN I/F 318 is connected to a LAN I/F 338 of the PC 203 through the LAN 304. The LAN I/F 318 enables data communication between the first scanner 301 and the PC 303, and is used for transmitting the data including the image data (raster data). According to the second embodiment, the first scanner 301 and the PC 303 communicate using TCP/IP as a data communication protocol.

The second scanner 302 includes, as shown in FIG. 9, a CPU 320, a ROM 321, a RAM 322, an NVRAM 323, a display unit 324, an operation unit 325, a scanning unit 326 and a LAN I/F 328, which are interconnected through a system bus 329.

Since the CPU 320, the ROM 321, the RAM 322, the NVRAM 323, the display unit 324, the operation unit 325 and the LAN I/F 328 function in the similar manner as the CPU 310, the ROM 311, the RAM 312, the NVRAM 313, the display unit 314, the operation unit 315 and the LAN I/F 318 operate, respectively, the description thereof is omitted for the sake of brevity.

The scanning unit 326 provides an optical scanning function for capturing image formed on a sheet of paper or film. The scanning unit 326 is also connected with the system bus 329 through an I/O interface (not shown). The scanning unit 326 performs, under control of the CPU 320, an optical scanning operation with respect to an original having an image to be captured thereon and place on a predetermined scanning position of the first scanner 301 in response to instructions transmitted from the second scanner driver 333b installed in the PC 303 to generate an image data (which may be raster data). The thus generated image data is transmitted to the PC 303 through the LAN 304.

The PC 303 includes, as shown in FIG. 9, a CPU 330, a ROM 331, a RAM 332, an HDD 333, a display unit 334, an operation unit 335, a CD-ROM drive 336 and a LAN I/F 338, which are interconnected with each other through a system bus 329 the PC 303 employs Microsoft Windows® as its OS.

The CPU 330 controls an entire operation of the PC 303. The CPU 330 is capable of transmitting a command to the first scanner 301 and/or the second scanner 302 to start the scanning operation. The CPU 330 is capable of selectively retrieving driver software installing program 333c, for example, from the HDD 333 and executes the retrieved program (e.g., the driver software installing program). The driver software installing program 333c will be described in detail later.

The ROM 331 and the RAM 332 are similar to the ROM 131 and the RAM 131 of the first embodiment, respectively, and description thereof will not be repeated.

The HDD 333 is a readable/writable storage (i.e., a hard disk) and a reading/writing device thereof. The HDD 333 stores, for example, the first scanner driver 333a, the second scanner driver 333b, a driver software installing program 333c and a registry 333h. The HDD 333 also stores image data (raster data) transmitted from the first scanner 301 and/or the second scanner 302.

The registry 333h is a database for central control of any setup information including the information of setup of the device drivers and the set up of the application under control of Microsoft Windows® (e.g., Windows 2000®, Windows XP®, Windows ME®) which serves as the OS. The plurality of pieces of the driver software occupy, in the registry, respective storage areas. Thus, the setup information of the first scanner driver 333a and the second scanner driver 333b are stored in the storage areas assigned, on the registry 333h, to the first scanner driver 333a and the second scanner driver 333b, respectively.

The first scanner driver 333a enables the PC 303 to connect with the first scanner 301. The first scanner driver 333a is provided by a vender of the first scanner 301 as driver software of the first scanner 301. According to the first embodiment, the first scanner driver 333a has been installed in the HDD 333 of the PC 303 by a user, and setup information of the first scanner driver 333a is the storage area of the registry 333h occupied by the first scanner driver 333a.

The second scanner driver 333b enables the PC 303 to connect with the second scanner 302. The second scanner driver 333b is provided by a vender of the second scanner 302 as driver software of the second scanner 302. According to the third embodiment, installation and setup of the second scanner driver 333b is to be executed by the driver software installing program 333c (described later).

The driver software installing program 333c is a program including one or a plurality of pieces of software which constitute a part of or all of the vender installer that semi-automates the installation and setup procedures for the second scanner driver 333b. The driver installing program 333c is illustrated in FIG. 10, and will be described later. It should be noted that the driver software installing program 333c is provided by the vender of the second scanner driver 302 in association with the second scanner driver 333b. The driver software installing program 333c includes a saving module 333d, a comparing module 333e, an identification module 333f and a setup module 333g.

The saving module 333d saves the registry 333h, which is the system information of the OS, before the installation of the driver software. Specifically, the saving module 333d saves the contents of the area of the registry 333h corresponding to the Driver Class defined by the OS before the installation is executed. In the example shown in FIG. 2, the saving module 333d saves the data in "My Computer¥HKEY_LOCAL_MACHINE¥SYSTEM¥ CurrentControlSet¥Control|Class¥[68DD1FC6-810F-11D0-BEC7-08002BE2092F]".

The comparing module 333e compares the registry 333h saved by the saving module 333d with the updated registry 333h that is updated as the installation is started, and obtains the difference therebetween. For example, in FIG. 2, the difference such as "0000", "0001" etc. under the directory of "My Computer¥HKEY_LOCAL_MACHINE¥SYSTEM¥ CurrentControlSet¥Control|Class¥[68DD1FC6-810F-11D0-BEC7-08002BE2092F]" is obtained by the comparing module 333e.

The identification module 333f identifies the second scanner driver 333b, installation of which is started, based on the comparison result of the comparing module 333e. Specifically, after the installation of the second scanner driver 333b is started, the area such as "0001" (see FIG. 2) is newly created under the directory of "My Computer¥HKEY_LOCAL_MACHINE¥SYSTEM¥ CurrentControlSet¥Control|Class¥[68DD1FC6-810F-11D0-BEC7-08002BE2092F]", which area (e.g., "0002") is occupied by the newly installed second scanner driver 333b. Such a difference (increment) can be obtained by the comparison performed by the comparing module 333e, and with the difference, the second scanner driver 333b to be set up can be identified.

The setup module 333g performs the setup operation with respect to the second scanner driver 333b, which is identified by the identification module 333f as the second scanner driver 333b being installed, or to be set up. For example, the setup module 333g writes setup information (e.g., an IP address) of the second scanner 302 input, by a user, through the operation unit 335 during the procedure of the driver software installing program 333c in the storage area of the registry 333h occupied by the second scanner driver 333b as a value of a key. For example, when "11.22.33.44" is input as the IP address of the second scanner 302, as shown in a window of the registry editor shown in FIG. 3, the input IP address "11.22.33.44" is written as a value of the [IPAddress] key in the "Device Data" within the storage area occupied by the second scanner driver 333b.

The display unit 334, the operation unit 335, the CD-ROM drive 336 and the LAN I/O 338 are similar to the display unit 134, the operation unit 135, the CD-ROM drive 136 and the LAN I/F 138 of the first embodiment, respectively, and the description thereof will be omitted.

Next, referring to FIG. 10, the installation and setup of the driver software (i.e., the second scanner driver 333b) executed in the driver installing system 300 according to the second embodiment will be described.

FIG. 10 is a flowchart illustrating a driver software installing procedure. In response to the user's predetermined operation, the CPU 330 of the PC 303 retrieves the driver software installing program 333c from the HDD 333 and executes the same.

When the driver software installing program 333c is executed by the user, the saving module 333d saves the registry 333h before the installation is started (S301).

In S302, the driver software installing program 333c instructs the OS installer to start the installation of the second scanner driver 333b, thereby the installation of the second scanner driver 333b in the PC 303 by the OS installer is started (S302).

When the installation of the second scanner driver 333b by the OS installer is finished, the second scanner driver 333b is stored in the HDD 333 of the PC 303, and the OS installer notifies the driver software installing program 333c of the completion of the installation. Then, the driver software installing program 333c instructs the display unit 334 to display a window for inputting setup information for the second scanner driver 333b. Then the driver software installing program 333c obtains the setup information (e.g., the IP address) regarding the second scanner driver 333b input by the user through the operation unit 335 (S303).

After the setup information regarding the second scanner driver 333b is obtained in S303, the comparing module 333e compares the registry 333h which was saved before the installation is started with the registry 333h which has been updated as the installation has been started (S304). As described above, with this comparison, the difference between the previously saved registry 333h and the updated registry 333h is obtained.

In S305, the identification module 333f identifies the second scanner driver 333b based on the comparison result in S304.

Then, the setup module 333g writes the setup information with respect to the second scanner driver 333b that is identified by the identification module 333f (S306).

As above, with the driver software installing system 300 according to the third embodiment of the invention, the comparing module 333e compares the area of the registry 333h indicative of the status of the Driver Class before the installation is started with that after the installation has been started and obtains the difference therebetween (S304). Therefore, the identification module 333f can identify the area of the registry 333h, which area has not been included in the registry 333h before the installation is started, and is included after the installation is started. The area created after the installation is started corresponds to the second scanner driver 333b, and thus, the identification module 333f identifies the second scanner driver 333b subject to be set up. That is, the second scanner driver 333b can be distinguished from the previously installed driver software (e.g., the first scanner driver 333a), and the setup module 333g can execute the setup of the second scanner driver 333b correctly since the second scanner driver 333b to be set up is correctly identified.

The present invention has been described using detailed descriptions of embodiments thereof that are provided by way of example and are not intended to limit the scope of the invention. Various modifications of embodiments of the present invention that are described may occur to persons of the art. The scope of the invention is limited only by the following claims.

In the driver software installing system 100 according to the first embodiment, the driver software installing program 113c is stored in the HDD 133, which is retrieved and executed by the CPU 130. The invention need not be limited to such a configuration, and the driver software installing program may be stored in another removable recording medium such as the CD-ROM or distributed on a network such as the Internet. In such a case, the driver software installing program may be once stored in the RAM 132 temporarily, and then retrieved and executed by the CPU 130. Such a modification also applies to the second or the third embodiment.

In the above-described embodiments, the driver software installing systems 100, 200, 300 employ Microsoft Windows® as the OS of the PCs 103, 203, 303. The invention is not limited to such systems, and can be applied to another system in which MAC® OS is employed as the OS of the personal computer. In such a case, instead of the registry 133h or 333h, a resource should be referred to.

According to the first embodiment, when the driver software is installed in accordance with the procedure defined by the OS, the identification information for identifying the driver software, which is under process of installation, is created. Therefore, it becomes possible to identify the driver software based on the identification information, and the newly installed driver software can be distinguished from the previously installed driver software. As a result, the driver software to be set up can be correctly identified, and the set up of the same can be performed successfully.

Further, according to the first embodiment, when the identification information becomes unnecessary, it is invalidated. Therefore, the identification information will not cause a trouble in successive installation of other driver software.

According to the first embodiment, when the driver software is installed in accordance with the procedure provided by the operating system, the identification information for identifying the driver software being installed is stored in the area which is occupied by the driver software. Therefore, by detecting the identification information from the registry, the area including the identification information can be identified, and the driver software occupying the thus identified area of the registry can be identified as the driver software to be set up. Thus, the driver software currently installed and the previously installed driver software can be clearly distinguished. Accordingly, the driver software to be set up can be correctly identified, and the set up of the same can be performed successfully.

According to the first embodiment, before the installing operation is started in accordance with the operation of the operating system, all the identification information is invalidated by deleting or modifying the same so that the identification module cannot detect the identification data. AS a result, after the installing operation is started, only one piece of identification information is valid, which ensures that the identification information is detected correctly.

According to the second embodiment, when the installation of the driver software is started, the installation log is obtained. Therefore, it is possible to identify the driver software based on the contents of the installation log, and to distinguish the currently installed driver software from the previously installed driver software. Therefore, the driver software to be set up can be correctly identified, and the set up of the same can be performed successfully.

Further, according to the second embodiment, when the installation of the driver software is started, the installation log including information of a storage area occupied by the driver software, which information is updated by the operating system, is obtained. Therefore, it is possible to the identify the driver software to be set up with reference to the information related to the storage are occupied by the driver software that is currently being installed. Therefore, it is possible to distinguish the currently installed driver software from the previously installed driver software. Therefore, the driver software to be set up can be correctly identified, and the set up of the same can be performed successfully.

Furthermore, according to the second embodiment, when the installation log is searched, the log including at least a part of the contents of the INF file or the name of the INF file, which is referred to when the OS installs the driver software. Based on the storage area in the registry occupied by the driver software indicated in the latest installation log, the driver software to be set up is identified. As a result, the driver software to be set up can be correctly identified, and the set up of the same can be performed successfully.

According to the third embodiment, the system information before the installation of the driver software according to the procedure of the operating system is started, and the system information after the installation is started are compared to detect the difference therebetween. It is possible to identify the driver software based on the difference as detected. Therefore, it is possible to distinguish the currently installed driver software from the previously installed driver software. As a result, the driver software to be set up can be correctly identified, and the set up of the same can be performed successfully. In particular, the contents of the registry may be used as the system information.

According to the above-described embodiments and modifications, the driver software for devices processing image data is installed. It should be noted that the installing operation of the driver software of the image data processing devices is not well supported by the OS for the time being. When the configuration according to the invention is employed in such devices, the installation of the driver software becomes reliable.

It should be noted that the present invention is applicable in any environment where a plurality of devices that require the same device driver are logically connected to one personal computer. Such devices and the device driver may be digital cameras and a digital camera driver, multi-function peripherals, which have scanner and printer and/or facsimile functions, and a scanner driver for scanner functions of the multi-function peripherals, and the multi-function peripherals and a scanner driver for scanning operations of the facsimile functions. The invention is also applicable to a case where a multi-function peripheral having scanner/printer/facsimile functions is connected to a personal computer, and the same scanner driver is used for a scanning operation of the scanner function and for a scanning operation of the facsimile function.

The present disclosure relates to the subject matter contained in Japanese Patent Application No. 2003-000115, filed on Jan. 6, 2003, which is expressly incorporated herein by reference in its entirety.

What is claimed is:

1. A driver software installing system, comprising:
   a computer that includes a memory, the computer being communicatively connected to an electronic device;
   an installation system that performs installation of driver software in the computer in accordance with a procedure of an operating system of the computer, the driver software enabling the computer to control the electronic device connected to the computer; and
   a setup system that performs setup of the driver software that is installed in the computer by the installation system,
   the setup system including:
   an instructing module that instructs the installation system to generate identification information for identifying the driver software when the installation of the driving software is performed, the installation system being configured to generate and store the identification information in an area of the memory based on the instruction of the instructing module, the area of the memory being occupied by the installed driver software;
   an identifying module that identifies the installed driver software by searching the area of the memory occupied by the installed driver software and determines whether the installed driver software is to be set up or not by judging whether the area of the memory occupied by the identified installed driver software includes data indicating that the identified installed driver software is to be set up; and
   a setup module that performs setup operation for the installed driver software that is identified and determined, by the identifying module, to be set up.

2. The driver software installing system according to claim 1, wherein the setup system further includes an invalidating module that invalidates the identification information so that the identifying module cannot identify the driver software based on the identification information after the setup module performs the setup operation for the driver software.

3. The driver software installing system according to claim 2, wherein the invalidating module invalidates the identification information by deleting the identification information.

4. The driver software installing system according to claim 2, wherein the invalidating module invalidates the identification information by modifying the identification information.

5. The driver software installing system according to claim 2,
   wherein the instructing module instructs the operating system to store the identification information as generated in a storage area, provided in a registry, corresponding to the driver software, and
   wherein the identifying module detects the identification information which is not invalidated by the invalidating module from the registry and determines the driver software, using the storage area where the identification information which is not invalidated is stored, as the identified driver software.

6. The driver software installing system according to claim 2, wherein the invalidating module invalidates the identification information before the installation system starts installation of the driver software.

7. The driver software installing system according to claim 1, wherein the setup system further includes an invalidating module that invalidates the identification information so that the identifying module cannot identify the driver software based on the identification information before the installation system starts installation of the driver software.

8. The driver software installing system according to claim 1, wherein the electronic device is an image generating device.

9. A driver software installing system, comprising:
   a computer communicatively connected to an electronic device;
   an installation system that performs installation of driver software in the computer in accordance with a procedure of an operating system of the computer, the driver software enabling the computer to control the electronic device connected to the computer; and
   a setup system that performs setup of the driver software that is installed in the computer by the installation system,
   the setup system including:
   a saving module that saves system information of the operating system before the installation of the driver software is performed;
   a comparing module that compares the system information saved before the installation of the driver software by the saving module, with the system information updated by the installation of the driver software by the operating system;
   an identifying module that identifies which driver software is to be set up based on a difference between the saved system information and the updated system information obtained as a result of comparison performed by the comparing module; and a setup module that performs setup operation for the installed driver software identified by the identifying module to be set up, wherein the system information includes a registry in which a storage area used by the driver software is provided, and wherein the identifying module detects a storage area which was not provided in the registry before the installation of the driver software and is provided in the registry after the installation of the driver software based on the result of the comparison performed by the comparing module, the driver software using the detected storage area being determined as the identified driver software.

10. A computer communicatively connected with an electronic device, the computer being implemented with a driver software installing system that installs driver software for controlling the electronic device, the driver software installing system including:

a memory;

an installation system that performs installation of driver software in the computer in accordance with a procedure of an operating system of the computer, the driver software enabling the computer to control the electronic device connected to the computer; and a setup system that performs setup of the driver software that is installed in the computer by the installation system, the setup system including:

an instructing module that instructs the installation system to generate identification information for identifying the driver software when the installation of the driving software is performed, the installation system being configured to generate and store the identification information in an area of the memory based on the instruction of the instructing module, the area of the memory being occupied by the installed driver software;

an identifying module that identifies the installed driver software by searching the area of the memory occupied by the installed driver software and determines whether the installed driver software is to be set up or not by judging whether the area of the memory occupied by the identified installed driver software includes data indicating that the identified installed driver software is to be set up; and a setup module that performs setup operation for the installed driver software that is identified and determined, by the identifying module, to be set up.

11. A method of installing driver software for performing installation of driver software in a computer in accordance with a procedure of an operating system of the computer, the driver software enabling the computer to control the electronic device which is communicatively connected to the computer and setup of the driver software that is installed in the computer, the method including the steps of:

instructing to generate identification information for identifying the driver software when the installation of the driving software is performed, the identification information being generated and stored in an area of a memory based on the instruction to generate the identification information, the area of the memory being occupied by the installed driver software;

identifying the installed driver software by searching the area of the memory occupied by the installed driver software and determining whether the installed driver software is to be set up or not by judging whether the area of the memory occupied by the identified installed driver software includes data indicating that the identified installed driver software is to be set up; and performing a setup operation for the installed driver software identified and determined, in the step of identifying and determining, to be set up.

12. A computer readable medium having embodied thereon a computer program product that controls a computer to install driver software for performing installation of driver software in the computer in accordance with a procedure of an operating system of the computer, the driver software enabling the computer to control the electronic device which is communicatively connected to the computer and setup of the driver software that is installed in the computer, the computer program product including the instructions of:

instructing to generate identification information for identifying the driver software when the installation of the driving software is performed, the identification information being generated and stored in an area of a memory based on the instruction to generate the identification information, the area of the memory being occupied by the installed driver software;

identifying the installed driver software by searching the area of the memory occupied by the installed driver software and determining whether the installed driver software is to be set up or not by judging whether the area of the memory occupied by the identified installed driver software includes data indicating that the identified installed driver software is to be set up; and performing a setup operation for the installed driver software identified and determined, in the step of identifying and determining, to be set up.

* * * * *